(12) United States Patent
Zavodchikov et al.

(10) Patent No.: US 7,704,334 B2
(45) Date of Patent: Apr. 27, 2010

(54) ZIRCONIUM-NIOBIUM OXYGEN-CONTAINING ALLOY AND METHOD FOR PRODUCING SAID ALLOY

(75) Inventors: Sergey Yurievich Zavodchikov, Udmurt Republic (RU); Valentina Mikhailovna Arzhakova, Moscow (RU); Oleg Viktorovich Bocharov, Moscow (RU); Lev Borisovich Zuev, Tomsk (RU); Vladimir Andreevich Kotrekhov, Udmurt Republic (RU); Vladimir Vladimirovich Rozhdestvenskiy, Udmurt Republic (RU); Olga Stepanovna Tarasèvich, Udmurt Republic (RU); Vladimir Borisovich Philippov, Udmurt Republic (RU); Alexandr Konstantinovich Shikov, Moscow (RU)

(73) Assignees: Otkrytoe Aktsionernoe Obschestvo "Chepetskiy Mekhanichesky Zavod", Glazov, Udmurt Republic (RU); The Federal State Unitarian Enterprise "A.A. Bochvar All-Russia Research Institute of Inorganic Materials", Moscow (RU)

( * ) Notice: Subject to any disclaimer, the term of this patent is extended or adjusted under 35 U.S.C. 154(b) by 923 days.

(21) Appl. No.: 10/545,124

(22) PCT Filed: Dec. 22, 2003

(86) PCT No.: PCT/RU03/00570

§ 371 (c)(1),
(2), (4) Date: Jul. 15, 2006

(87) PCT Pub. No.: WO2004/057046

PCT Pub. Date: Jul. 8, 2004

(65) Prior Publication Data

US 2007/0080328 A1    Apr. 12, 2007

(30) Foreign Application Priority Data

Dec. 23, 2002   (RU) .............. 2002134675

(51) Int. Cl.
*C22C 14/00*    (2006.01)
(52) U.S. Cl. ................... 148/421
(58) Field of Classification Search ........ 148/421
See application file for complete search history.

(56) References Cited

U.S. PATENT DOCUMENTS

| 5,125,985 A | 6/1992 | Foster et al. ............ 148/672 |
| 5,366,690 A | 11/1994 | Garde ................... 420/422 |

FOREIGN PATENT DOCUMENTS

| EP | 0532830 | 3/1993 |
| EP | 0538778 | 4/1993 |
| RU | 2141539 C1 | 11/1999 |
| RU | 2141540 C1 | 11/1999 |
| RU | 2199600 C2 | 2/2003 |

*Primary Examiner*—Roy King
*Assistant Examiner*—Jessee R. Roe
(74) *Attorney, Agent, or Firm*—patenttm.us

(57) ABSTRACT

The invention relates to zirconium-based alloys and methods for manufacturing thereof and may be used in nuclear power engineering. The invention, as claimed, solves the task of obtaining a zirconium-based alloy used for manufacturing fuel rods for the nuclear reactor core, which possess improved engineering and operational properties. The said zirconium-based alloy contains its components in the following weight percent ratio: niobium—0.9-1.1, oxygen—0.05-0.09, zirconium—the rest, and has the structure consisting of alpha-zirconium with oxygen irregularity zones not exceeding 30 nanometers, zirconium sub-oxide of non-stoichiometric composition, and beta-niobium. The inventive method of manufacturing the said alloy includes making stock of zirconium-containing material and niobium pentoxide as oxygen-containing and niobium-containing materials, stock treatment and manufacturing an ingot having the above composition.

2 Claims, No Drawings

ZIRCONIUM-NIOBIUM OXYGEN-CONTAINING ALLOY AND METHOD FOR PRODUCING SAID ALLOY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The invention relates to zirconium-based alloys and methods for manufacturing thereof and may be used in nuclear power engineering.

E110 alloy is known in the art, which is widely used in the core of nuclear reactors, comprising 1.0 percent by wt. of niobium (Specifications TU95.166-98 "ZIRCONIUM ALLOYS IN INGOTS"). The mass content of oxygen present in E110 alloy as a natural impurity does not exceed 0.05 percent by wt. and is due to its presence in the original stock components.

In spite of good operational performance, the said alloy has some disadvantages, in particular high thermal and radiation creepage (see, M. I. Solonin, Yu. K. Bibilashvili, A. V. Nikulina et al. "The Condition of and Prospects for Development of Works on Fuel Rods and Materials for Water-Cooled Reactors in Russia". Collection of Reports Presented at the Fifth Inter-Industry Conference on Science of Reactor Materials. V.1, p. 3-32, Dimitrovgrad, GNTs RF NIIAR, 1998).

M5 alloy is known in the art, which contains, in percent by wt.: niobium—0.81-1.2, oxygen—0.090-0.149, zirconium—the rest ("Update on the Development of Advanced Zirconium Alloys for PWR Fuel Rod Claddings". J. P. Mardon, G. Garner, P. Beslu, D. Charquet, J. Senevat. International Topical Meeting on Light Water Reactor Fuel Performance. Portland, Oreg. Mar. 2-6, 1997. Published by the American Nuclear Society, Inc. La Grange Park, Ill. 60526, USA). This publication shows a positive effect of the sulfur impurity in M5 alloy on creepage of fuel rod cladding materials.

An optimized composition of M5 alloy is known, which contains, in addition to doping components, in percent by wt.: niobium—0.81-1.2, oxygen—0.090-0.180, at the presence of the following impurities: iron—150-600 ppm, silicon—25-120 ppm, sulfur—0-35 ppm; zirconium—the rest (Jean-Paul Mardon, Daniel Charquet and Jean Senevat "Influence of Composition and Process on Out-of-Pile and In-Pile Properties of M5 Alloy". Twelfth International Symposium on Zirconium in the Nuclear Industry. ASTM. Jun. 15-18, 1998, Toronto, Ontario, Canada). The structure of the said alloy includes intermetallic compounds having dimensions from 100 to 200 nanometers of $Zr(Nb, Fe, Cr)_2$ with the hexagonal lattice (a=0.54 nanometers, c=0.86 nanometers) and comprising 41±4 wt. percent of niobium and 18±3 wt. percent Fe+Cr. And the intermetallic compounds $Zr(Nb, Fe, Cr)_2$ are present in the alloy containing 100 ppm of iron and 15 ppm of chrome.

In the said modifications of M5 alloy it is very difficult to ensure a stable chemical composition through the ingot volume due to the complexity of obtaining a uniform distribution of doping additives, in particular sulfur, having very small concentrations in an ingot. Furthermore, the presence of large (100-200 nanometers) intermetallic compounds $Zr(Nb, Fe, Cr)_2$ in the alloy structure results in the alloy manufacturability.

A zirconium-based alloy containing 0.8-1.3 wt. percent of niobium is known, which comprises, in parts per million: iron—50-250, oxygen—1,000-1,600, carbon<200, silicon<120 and unavoidable impurities (RF Patent # 2155997, $IPC^7$ G 21 C 3/06, 3/07, publ. on Sep. 10, 2000. Bull. #25).

The said alloy, however, is used only for manufacturing tubular claddings and tubular guides for nuclear fuel rods and may not be used for manufacturing bars, sheets and other products. Furthermore, manufacturing tubes of the said alloy required that significant number (four or more) cold rolling stages be used.

A zirconium-based alloy is known, which is used for manufacturing fuel rods for nuclear reactors cores stable to creepage and corrosion under the influence of water and steam (RF Patent # 2199600 for the invention "A zirconium-based alloy stable to creepage and corrosion induced by water and steam, a method for manufacturing thereof, and its application in a nuclear reactor", publ. on May 20, 1999, Bull. # 14). The said alloy contains 0.7-1.3 wt. percent of niobium, 0.09-1.16 wt. percent of oxygen and 8-100 ppm of sulfur.

A method of manufacturing the said alloy is also known, according to which zirconium dioxide or sulfur-containing zirconium dioxide is added, while making the stock, to the source material. Then, an ingot of the alloy, which has the above composition, is melted. The said alloy and the method of manufacturing it are most close to the claimed invention.

The said alloy is disadvantageous in that its capability to plastic deformation is lowered due to a high (more than 0.09 wt. percent) oxygen content. This forces to develop complex technologies for pressure-processing the alloy on a special equipment. Moreover, when manufacturing the said alloy it is difficult to ensure a uniform distribution of sulfur present in an insignificant quantity through the ingot volume (Elaine Hiruo, FRAATOM: SMALL MATERIALS DIFFERENCE MIGHT EXPLAIN WHY M5 SUPERIOR TO E110. Nuclear Fuel—Apr. 16, 2001-13).

When using the known method of manufacturing the alloy, it is difficult to ensure a uniform distribution of oxygen through the ingot volume. This is conditioned by the fact that, when melting the alloy, zirconium dioxide is used, which has the melting temperature about 1,000° C. higher that the melting temperature of zirconium, as the oxygen carrier. Moreover, the zirconium dioxide dilution rate in the melt is much lower that the alloy rate of crystallization. These factors contribute to non-uniform distribution of oxygen in ingots, which may result in its poor manufacturability during the subsequent hot and cold deformation, since oxygen-enriched parts of the ingot act as the stress concentrators.

BRIEF SUMMARY OF THE INVENTION

The claimed invention solves the task of obtaining a zirconium-based alloy used for manufacturing fuel rods, having improved technological and operational properties, for cores of nuclear reactors.

BRIEF DESCRIPTION OF THE SEVERAL VIEWS OF THE DRAWINGS

Not Applicable

DETAILED DESCRIPTION OF THE INVENTION

The stated task is solved owing to that the zirconium-based alloy, containing niobium and oxygen, contains the components in the following ratio, in wt. percent:
niobium—0.9-1.1
oxygen—0.05-0.09
zirconium—the rest
and has the structure consisting of alpha-zirconium with oxygen irregularity zones not exceeding 30 nanometers, zirconium sub-oxide of non-stoichiometric composition, and beta-niobium.

The stated task is also solved by that the method for manufacturing the zirconium-based alloy, which includes making a stock of zirconium-containing, niobium-containing and oxygen-containing materials, preparing the stock and obtaining an ingot, niobium pentoxide is introduced into the stock as the oxygen-containing and niobium-containing material, thus obtaining the alloy containing the said components in the following weight percent ratio:
niobium—0.9-1.1
oxygen—0.05-0.09
zirconium—the rest.

In a particular embodiment of the method electrolytic zirconium powder is used as the zirconium-containing material when making the stock.

In another particular embodiment of the method zirconium sponge is used as the zirconium-containing material when making the stock.

In another particular embodiment of the method zirconium iodide is used as the zirconium-containing material when making the stock.

In another particular embodiment of the method recycled metallic zirconium is used as the zirconium-containing material when making the stock.

In another particular embodiment of the method niobium powder, as the niobium-containing material, is added up to the required niobium content of the alloy when making the stock.

Niobium pentoxide ($Nb_2O_5$) with the melting temperature of 1780° C., which is lower than the melting temperature of zirconium (1862° C.), as used according to the claimed method, is in its liquid state in the process of zirconium melting, which ensures a uniform distribution of niobium and oxygen in an ingot. The quantity of niobium pentoxide, as introduced in the claimed alloy, depends on the composition of the source materials, since the oxygen content of an electrolytic zirconium powder, zirconium iodide and zirconium sponge, as form the base of the stock for the alloy, varies significantly (A. S. Zaimovsky, A. V. Nikulina, N. G. Reshetnikov. Zirconium alloys in the nuclear industry. Moscow, Energoatomizdat, 1994, p. 29).

After melting and mechanically and thermally treating, as provided for by the technological process, the source ingot of the claimed composition, zones of non-uniform oxygen distribution appear in alpha-zirconium grains, which correspond to a continuous series of states—from an ordered solid solution of oxygen in alpha-zirconium to pre-discharges of sub-oxides. The dimensions of such zones of non-uniformity and pre-discharges do not exceed 30 nanometers. They are coherently linked with the zirconium matrix and form efficient barriers for microshear deformation processes, thus contributing to additional hardening of the product material. The presence of a mixture of fine coherent oxygen-containing compounds and greater (50 nanometers) particles of the β-niobium phase in the alloy structure improves the efficiency of forming high technological and operational properties of products made of the alloy with the claimed composition.

The optimal oxygen content of the alloy claimed composition is in the range from 0.05 to 0.09 percent by weight. An increase in the oxygen content of the alloy above 0.09 percent by weight contributes to formation of brittle oxides causing lower plasticity properties of the material. If the oxygen content of the alloy is lower than 0.05 percent by weight, the hardening action of oxygen is lowered, since it is limited to hardening the zirconium matrix only due to formation of a solid solution.

Several concrete examples of manufacturing ingots from the claimed alloy composition are given below.

Example 1

Electrolytic zirconium powder as the source material was mixed with niobium powder and niobium pentoxide powder, proceeding from the required content of niobium and oxygen in the alloy. The powder mixture was used for pressing briquettes having an inner hole into which a recycled metal bar made of zirconium-niobium alloy was placed. The electrode made in this way was tied round with bars of zirconium iodide and twice melted. The obtained alloy ingot contained, in percent by weight: niobium—0.9, oxygen—0.053, unavoidable impurities, zirconium—the rest.

Example 2

Crushed zirconium sponge was mixed with recycled metal, niobium powder and niobium pentoxide powder, proceeding from the required content of niobium and oxygen in the alloy. Briquettes were pressed, which were collected into an electrode by using zirconium iodide bars. The obtained electrode was twice melted. The obtained alloy ingot contained, in percent by weight: niobium—1.1, oxygen—0.088, unavoidable impurities, zirconium—the rest.

The properties of the alloys obtained in accordance with the claimed invention are given in Tables 1 to 3.

Table 1 shows differences in the alloy compositions manufactured according to the claimed invention, the analogous solutions and the prototype.

Table 2 provides data on mechanical properties of tubes made of the alloy having the inventive composition, which were treated by traditional methods (without using special equipment), as compared to mechanical properties of tubes made according the same technology of the alloy containing less than 0.05 wt. percent of oxygen.

The values for ultimate strength and yield point of tubes made of the alloy having the claimed composition is significantly higher (by more than 10%) at relative elongation values ensuring manufacturability of the alloy. Furthermore, when determining microhardness of the said tubes certain results were obtained that showed its higher values (1,550 MPa) as compared to 1380 MPa for the alloy containing less than 0.05 wt. percent of oxygen.

Table 3 shows the results of testing tubes for creepage under internal pressure of 110 MPa at 400° C. for 1,000 hours, the said tubes being made of the alloy having the claimed composition, in comparison to an alloy containing less than 0.05 wt. percent of oxygen. After increasing the oxygen content of the alloy from 0.035 to 0.053 wt. percent creep strain was reduced by 10% for 1,000 hours, and after increasing the oxygen content up to 0.088 wt. percent it was reduced by 22%.

Thus, the test results of technological and operational properties of the zirconium-niobium oxygen-containing alloy having the claimed composition clearly show that improved properties were obtained, and the alloy may be treated by traditional methods, without using special equipment.

The inventive alloy and the method of manufacturing thereof passed industrial tests at OAO "Chepetsky Mechanichesky Zavod" successfully.

TABLE 1

| Alloy | Doping components, in percent by weight | | |
|---|---|---|---|
| | niobium | oxygen | other |
| E110 | 0.90-1.10 | | |
| M5 | 0.81-1.20 | 0.090-0.149 | |
| Optimized M5 | 0.81-1.20 | 0.090-0.180 | |
| Prototype | 0.70-1.30 | 0.090-0.160 | Sulfur 100 ppm |
| Claimed composition of the alloy | 0.90-1.10 | 0.050-0.090 | |

TABLE 2

| The alloy oxygen content is 0.035 percent by weight | | | The alloy oxygen content is 0.088 percent by weight | | |
|---|---|---|---|---|---|
| $\sigma_u$, MPa min.-max. average | $\sigma_{0.2}$, MPa min.-max. average | $\delta$, % min.-max. average | $\sigma_u$, MPa min.-max. average | $\sigma_{0.2}$, MPa min.-max. average | $\delta$, % min.-max. average |
| 375-385 | 350-360 | 30.0-32.0 | 432-444 | 400-420 | 28.0-29.0 |
| 380 | 355 | 31.0 | 438 | 410 | 28.5 |

TABLE 3

| Alloy | Creep strain (in percent) for time periods (in hours) | | | |
|---|---|---|---|---|
| | 250 hours | 500 hours | 750 hours | 1,000 hours |
| Alloy composition with $O_2$ = 0.035 wt. % | 0.53-0.68 0.60 | 0.91-1.0 0.97 | 1.46-1.74 1.60 | 1.81-2.08 1.95 |
| Claimed alloy composition with $O_2$ = 0.053 wt. % | 0.47-0.67 0.56 | 0.72-0.97 0.82 | 1.33-1.61 1.43 | 1.64-1.88 1.70 |
| Claimed alloy composition with $O_2$ = 0.088 wt. % | 0.47-0.61 0.53 | 0.69-0.96 0.80 | 1.19-1.34 1.25 | 1.45-1.62 1.52 |

The invention claimed is:

1. A method for manufacturing a zirconium-based alloy, which includes making a stock of zirconium-containing, niobium-containing and oxygen-containing materials, preparing the stock and obtaining an ingot, characterized in that niobium pentoxide is introduced into the stock as the oxygen-containing and niobium-containing material and that one material from the group: electrolytic zirconium powder, zirconium sponge, zirconium iodide, recycled metallic zirconium is introduced into the stock as the zirconium-containing material, thus obtaining the alloy containing the said components in the following weight percent ratio:

niobium—0.9-1.1
oxygen—0.05-0.09
zirconium—the rest.

2. The method according to claim 1, characterized in that niobium powder is added as an additional niobium-containing material, up to the required niobium content of the alloy when making the stock.

* * * * *